United States Patent [19]

Bachot et al.

[11] Patent Number: 5,470,449
[45] Date of Patent: Nov. 28, 1995

[54] MICROPOROUS ASBESTOS-FREE DIAPHRAGMS/CATHODES FOR ELECTROLYTIC CELLS

[75] Inventors: Jean Bachot, Bourg la Reine; Pascal Stutzmann, Paris, both of France

[73] Assignee: Rhone-Poulenc Chimie, Courbevoie, France

[21] Appl. No.: 274,150

[22] Filed: Jul. 14, 1994

Related U.S. Application Data

[63] Continuation of Ser. No. 948,456, Sep. 21, 1992, abandoned, which is a continuation of Ser. No. 565,385, Aug. 10, 1990, abandoned.

[30] Foreign Application Priority Data

Aug. 10, 1989 [FR] France ................. 89 10938

[51] Int. Cl.⁶ ............................. C25B 13/08; C25B 9/00
[52] U.S. Cl. .................. 204/252; 204/296; 204/282; 204/283; 427/77; 427/245; 427/243
[58] Field of Search .................... 204/252, 283, 204/295, 296, 282; 427/58, 77, 245, 243

[56] References Cited

U.S. PATENT DOCUMENTS

| | | | |
|---|---|---|---|
| 4,105,516 | 8/1978 | Martinsons et al. | 204/129 |
| 4,243,504 | 1/1981 | Fang et al. | 204/296 |
| 4,720,334 | 1/1988 | DuBois et al. | 204/296 |
| 4,775,551 | 10/1988 | Bachot et al. | 427/58 |
| 4,810,345 | 3/1989 | Schulz et al. | 204/295 |

FOREIGN PATENT DOCUMENTS

| | | | |
|---|---|---|---|
| 0132425 | 6/1984 | European Pat. Off. | C25B 11/04 |
| 0214066 | 7/1986 | European Pat. Off. | C25B 11/12 |
| 0296076 | 6/1988 | European Pat. Off. | C25B 11/04 |
| 2280435 | 4/1974 | France | B01K 3/10 |
| 2280609 | 7/1974 | France | C04B 43/04 |
| 2213850 | 8/1974 | France | B01K 3/10 |
| 2229739 | 12/1974 | France | C08J 1/34 |

*Primary Examiner*—Kathryn Gorgos
*Attorney, Agent, or Firm*—Burns, Doane, Swecker & Mathis

[57] ABSTRACT

Microporous diaphragms adapted for wet-consolidation with composite cathodes for use in electrolytic cells, e.g., chlorine/soda electrolysis cells, comprise a sintered, fluoropolymer microconsolidated asbestos-free microporous fibrous sheet material, such sheet material including from 3% to 35% by weight of fluoropolymer binder, from 0% to 50% by weight of a uniformly distributed gel of an oxohydroxide of at least one metal of Groups IVA, IVB, VB and VIB of the Periodic Table or of the lanthanide or actinide series thereof, and from 20% to 95% by weight of a mixture of poly-tetrafluoroethylene (PTFE) fibers and inorganic fibers, such inorganic fibers constituting from 1% to 80% by weight of the mixture and such inorganic fibers including carbon, graphite or titanate fibers, or admixture thereof.

38 Claims, No Drawings

MICROPOROUS ASBESTOS-FREE DIAPHRAGMS/CATHODES FOR ELECTROLYTIC CELLS

This application is a continuation of application Ser. No. 07/948,456, filed Sep. 21, 1992, now abandoned which is a continuation of application Ser. No. 07/565/385, filed Aug. 10, 1990, now abandoned.

CROSS-REFERENCE TO COMPANION APPLICATION

Copending application Ser. No. 07/565,344 , filed concurrently herewith and assigned to the assignee hereof.

BACKGROUND OF THE INVENTION

1. Field of the Invention

The present invention relates to novel diaphragms comprising thermoplastic fibers adapted for use in electrolytic cells, to the coupling of such diaphragms with a cathode component of such cells and to a process for producing such diaphragms and coupling such diaphragms with a cathode component.

This invention especially relates to improved diaphragms produced via a wet route, based on thermoplastic fibers and devoid of asbestos fibers, and adapted for use in chlorine/soda electrolysis cells.

2. Description of the Prior

Asbestos fibers have long been employed as a conventional material for producing the diaphragms used in electrolytic cells. These diaphragms are fabricated by depositing asbestos fibers contained in an aqueous mash onto a cathode which is permeable to the electrolytes, deposition operation being carried out under vacuum. Thus, French Patent No. 2,213,805 describes preparing microporous separators by depositing a layer of asbestos, said layer being consolidated by a fluoropolymer. The porosity of such a layer can be better controlled by adding a pore-forming agent according to the technique described in French Patent No. 2,229,739.

As is well known to this art, such preparation of microporous separators by depositing, under vacuum, an aqueous mash containing fibers and a binder presents a very great advantage, both from a technological standpoint, as well as from an economic standpoint. However, the quality of the separators thus produced is not fully satisfactory because of the necessity to use asbestos fibers. Indeed, notwithstanding the hazards associated with the handling of asbestos, which is dangerous to human health, the insufficient chemical stability inherent in asbestos presents various disadvantages such as excessively short useful life of the separators and difficulties in modifying the operating conditions of the electrolyzer, for example by increasing the electrical current.

In published European Patent Application No. 132,425 cathode components have been described, composite material produced by the coupling of an elementary cathode including a highly porous metal surface such as a metal grid having a mesh opening ranging from 20 µm to 5 mm and of a sheet containing fibers and a binder, the coupling and the sheet resulting from the programmed suction under vacuum of a suspension containing essentially electrically conductive fibers and a fluoropolymer, directly through said elementary cathode, followed by drying, and then melting the binder. Such composite materials are adapted to themselves constitute the cathode of an electrolysis cell and may be coupled with a diaphragm, it being possible for the diaphragm to be manufactured directly by a wet route on the composite.

Various improvements have also been made, both to the composite materials themselves, as well as to the process for the manufacture thereof.

In published European Patent Application No. 214,066 materials are described, containing carbon fibers exhibiting a monodisperse length distribution, materials whose quality and properties are very appreciably improved, and this is reflected in a much more favorable performance/thickness relationship.

In published European Patent Application No. 296,076 electroactivated materials are described which contain an electrocatalytic agent uniformly distributed within their bulk mass, said agent being selected from among Raney metals and Raney alloys from which most of the easily removable metal(s) has (have) been removed.

The assemblage of proposed cathode components which ensure an appreciable distribution of the current is adapted for use in an electrolytic cell which will comprise a membrane or a diaphragm between the anode and cathode compartments. Additional technical details are described in the aforementioned European patent applications, hereby expressly incorporated by reference in respect of the construction of said cathode components.

Similarly, it has long been proposed to manufacture microporous separators based on thermoplastic materials using traditional methods of shaping plastics, such as kneading, molding, calendering and/or sintering.

Thus, French Patents Nos. 2,280,435 and 2,280,609 describe the manufacture of microporous separators based on fluoropolymers. However, the planar diaphragms thus obtained are difficult to install in cells whose cathode components are geometrically complex, and they are very difficult to wet. It has not been possible to satisfactorily develop these separators, the cost of manufacture of which remains relatively very high.

Furthermore, it is not possible to produce satisfactory microporous separators simply by substituting the asbestos fibers in the mashes intended for the preparation of diaphragms by deposition under vacuum with fibers of a material such as polytetrafluoroethylene (PTFE) which would be a most attractive route for preparing microporous separators, especially in the case of cells whose cathode components are geometrically complex. Indeed, the layer of PTFE fibers shrinks very greatly during the sintering, the uniformity and the fineness of the porosity are inadequate and the hydrophilicity of the layer of fibers is precarious.

More recently, it was proposed in U.S. Pat. No. 4,680,101 to prepare a modified diaphragm by impregnating a preformed diaphragm (matrix) with a solution, in an organic solvent, of a partially hydrolyzed metal alkoxide represented, before hydrolysis, by the formula $M(OR)_4$, in which M is titanium, zirconium, silicon or aluminum, and R is an alkyl radical having from 1 to 6 carbon atoms; the diaphragm impregnated in this manner is then heated to 90°–150° C. to crosslink the polymeric metal oxide.

The matrix itself is formed by vacuum filtration on a cathode of a mash containing polytetrafluoroethylene which is fibrillated, if appropriate, an ethanol solution of a perfluoro ion exchanger containing sulfonic acid groups, followed by drying the product under vacuum in an oven at 120°–130° C. The perfluoro ion exchanger imparts wettability to such a diaphragm.

After forming this matrix and, preferably, after impregnating the latter with a view to providing it with a polymeric metal oxide, it is suggested to incorporate in the already formed diaphragm an inorganic gel such as gels of magnesium, zirconium or titanium oxides or a zirconyl phosphate gel; such gels are said to be capable of reducing the permeability of such a diaphragm to liquids and of imparting ion exchange properties to said diaphragm.

These impregnated diaphragms, whose basic advantage is apparent, exhibit various disadvantages and in particular a lack of homogeneity and a permeability which is difficult to control.

Furthermore, the process of manufacture is characterized by a complexity which is difficult to reconcile with industrial requirements.

SUMMARY OF THE INVENTION

A major object of the present invention is the provision of improved asbestos-free microporous separators, or diaphragms, by a wet route, by vacuum suction of an aqueous mash containing fluoropolymer-based fibers through a porous support, which improved microporous separators conspicuously ameliorate those disadvantages and drawbacks to date characterizing the state of this art.

Briefly, the present invention features novel microporous diaphragms that can be produced in situ by a wet route, comprising an asbestos-free fibrous sheet in which the fibers have been microconsolidated by a fluoropolymer, said sheet having been sintered and comprising:

(i) from 3% to 35% by weight of a fluoropolymer, binding the fibers;

(ii) from 0% to 50% by weight of a gel of an oxohydroxide of at least one metal of Groups IVA, IVB, VB and VIB of the Periodic Table or of the lanthanide and actinide series; and (iii) from 20% to 95% by weight of a mixture of polytetrafluoroethylene fibers and inorganic fibers, said inorganic fibers constituting from 1% to 80% by weight of said mixture and which comprise carbon, graphite or titanate fibers, or mixtures thereof.

The present invention also features the coupling of the above novel diaphragms to a composite cathode component.

This invention also features a process for the production of such diaphragms, comprising the following sequence of stages:

(a) preparing, in an essentially aqueous medium, a dispersion comprising the fibers, the fluoropolymer-based binder in the form of particles, if appropriate at least one precursor of an oxohydroxide of at least one of the metals of Groups IVA, IVB, VB and VIB of the Periodic Table or of the lanthanide and actinide series, also in particle form, and, if appropriate, additives;

(b) depositing a sheet by programmed vacuum filtration of said dispersion through a porous support material;

(c) removing the liquid medium and, if appropriate, drying the sheet thus formed;

(d) sintering the sheet; and (e) treating, if appropriate, in situ under the conditions of the electrolysis, the sintered sheet with an aqueous solution of an alkali metal hydroxide.

The porous material (support) may then constitute a composite cathode component and the above process then enables producing a coupling according to the present invention.

Thus, the present invention also features a process for the preparation of such couplings comprising the following sequence of stages:

(a) depositing a precathodic sheet by programmed vacuum filtration of a dispersion, in an essentially aqueous medium, of fibers, of binder in the form of particles and, if appropriate, of additives, through an elementary cathode which comprises a metal surface having mesh openings or perforations ranging from 20 μm to 5 mm;

(b) removing the liquid medium and, where appropriate, drying the sheet thus formed;

(c) programmed vacuum filtering, through the precathodic sheet, of a dispersion, in an essentially aqueous medium, of polytetrafluoroethylene fibers, of inorganic fibers selected from carbon, graphite and titanate fibers and mixtures thereof, of binder based on a fluoropolymer in the form of particles, if appropriate of at least one precursor of an oxohydroxide of at least one of the metals of Groups IVA, IVB, VB and VIB of the Periodic Table or of the lanthanide and actinide series, in the form of particles, and, if appropriate, of additives;

(d) removing the liquid medium and, where appropriate, drying the sheet thus formed;

(e) sintering of such sheet; and (f) treating, if appropriate in situ under the conditions of the electrolysis, such sintered sheet with an aqueous solution of an alkali metal hydroxide.

DETAILED DESCRIPTION OF THE PREFERRED EMBODIMENTS OF THE INVENTION

More particularly according to the present invention, the subject novel diaphragms exhibit an appreciable dimensional stability, a fine and uniform porosity and a permanent wettability. The diaphragms according to the present invention additionally exhibit very low operating voltages, and this constitutes another advantage of the present invention.

The diaphragms according to the present invention are advantageously produced by the routes, traditionally employed industrially, of deposition of a suspension by suction under vacuum, and permit the efficient operation (very high current yield, reduced operating voltage) of brine electrolysis cells comprising same, at high current densities which can extend up to 40 A/dm$^2$ and higher. Moreover, such diaphragms permit cell operation at high sodium hydroxide concentrations (on the order of 140 to 200 g/l or higher) in the catholyte, and this limits the energy consumption required for the subsequent concentration of sodium hydroxide.

The diaphragms according to the invention comprise an asbestos-free fibrous sheet. By "sheet" is intended a three-dimensional assembly or stack whose thickness is appreciably smaller than its other dimensions, it being possible for said assembly, if appropriate, to have two parallel face surfaces. These sheets can be in various forms, generally determined by the geometry of the cathode components with which they may later be coupled. In their use as microporous diaphragms in cells for their electrolysis of sodium chloride, and by way of example, their thickness typically ranges from 0.1 to 5 mm, and one of their long dimensions, corresponding substantially to the height of the cathode component, can extend up to 1 m or even more, and the other long dimension, reflecting substantially the perimeter of the component in question, can extend up to several tens of meters.

The fibers of the sheet are microconsolidated, namely, they are, in a fashion, attached or interconnected to each other, above all, by a three-dimensional network of discrete bonding points, and this contributes to ensuring that the sheet has a porosity which is at the same time fine and uniform, and a very great cohesion.

These sheets (or fibrous stacks) according to the invention are devoid of or free from asbestos and essentially consist of, as indicated above:

(i) from 3% to 35% by weight of a fluoropolymer binder for the fibers;

(ii) from 0% to 50% by weight of a gel of an oxohydroxide of at least one metal of Groups IVA, IVB, VB and VIB of the Periodic Table or of the lanthanide and actinide series;

(iii) from 20% to 95% by weight of a mixture of polytetrafluoroethylene fibers and of inorganic fibers, said inorganic fibers constituting from 1% to 80% by weight of said mixture and which comprise carbon, graphite or titanate fibers, or mixtures thereof.

By "fluoropolymer" is intended a homopolymer or a copolymer derived at least partly from olefinic monomers completely substituted by fluorine atoms or completely substituted by a combination of fluorine atoms and of at least one of chlorine, bromine or iodine atoms per monomer.

Exemplary fluoro homo- or copolymers include polymers and copolymers derived from tetrafluoroethylene, hexafluoropropylene, chlorotrifluoroethylene and bromotrifluoroethylene.

Such fluoropolymers may also contain up to 75 mole percent of recurring structural units derived from other ethylenically unsaturated monomers containing at least as many fluorine atoms as carbon atoms, such as, for example, vinylidene (di)fluoride, or vinyl perfluoroalkyl ethers such as perfluoroalkoxyethylene.

A plurality of fluoro homo- or copolymers such as defined above can, of course, be used according to the invention. It too will be appreciated that it is also within the scope of the invention to use together with these fluoropolymers a small quantity, for example up to 10% to 15% by weight of polymers that do not contain fluorine atoms, such as, for example, polypropylene.

Polytetrafluoroethylene is the preferred binder of the diaphragms according to the invention.

The fluoropolymer employed as the binder for the assembly of fibers may be present in the subject diaphragms in amounts which can vary over wide limits, bearing in mind the fiber content and the nature of the various constituents of such diaphragms.

However, to ensure a good consolidation of the assembly, the binder will preferably constitute from 5% to 40% by weight in the subassembly (fibers+binder).

The diaphragms according to the invention also contain from 20% to 95% by weight of a mixture of polytetrafluoroethylene (PTFE) fibers and of inorganic fibers, the proportion and nature of which have been indicated above.

The PTFE fibers according to the present invention may be of variable sizes; their diameter (D) typically ranges from 10 to 500 μm and their length (L) is such that the ratio (L/D) advantageously ranges from 5 to 500. Those preferred are PTFE fibers having mean dimensions ranging from 1 to 4 mm in the case of length and ranging from 50 to 200 μm in the case of diameter. Their preparation is describe in U.S. Pat. No. 4,444,640 and PTFE fibers of this type are known to the art. As will become apparent from the description which follows, it is advantageous to subject said PTFE fibers to a pretreatment to disperse the fibers and to limit the proportion of aggregates which they tend to form.

The diaphragms according to the invention also contain inorganic fibers selected from among carbon, graphite and titanate fibers and mixtures thereof, the proportion of the inorganic fibers constituting from 1% to 80% by weight of the combined fibers.

The carbon or graphite fibers are in the form of filaments whose diameter is generally smaller than 1 mm and preferably ranges from $10^{-5}$ to 0.1 mm and whose length is greater than 0.5 mm and preferably ranges from 1 to 20 mm.

These carbon or graphite fibers preferably have a monodisperse length distribution, namely, a distribution of lengths such that the length of at least 80%, and advantageously of at least 90%, of the fibers is within ± 20%, and preferably within ± 10%, of the average length of the fibers. When they are present, these carbon fibers advantageously constitute not more than 10% by weight of the combined fibers.

The titanate fibers are fibrous materials which are known per se. Thus, potassium titanate fibers are available commercially. Other suitable fibers are those derived from potassium octatitanate $K_2Ti_8O_{17}$ by partial replacement of the ions of titanium in the oxidation state of IV with metal cations in the oxidation state of II, such as magnesium and nickel cations, or in the oxidation state of III, such as iron or chromium cations, and using charge compensation ensured by alkali metal ions such as sodium and potassium cations. These are described in published French Patent Application No. 2,555,207.

Other titanate fibers, such as those of potassium tetratitanate ($K_2Ti_4O_9$) or those derived therefrom, can also be employed. While the titanate fibers can, without major inconvenience, constitute up to 80% by weight of the fiber mixture employed, it is preferable, when using carbon or graphite fibers, that their proportion in the fiber mixture should not exceed 10% by weight.

Mixtures of inorganic fibers which differ in their nature can, of course, also be employed.

The diaphragms according to the invention also contain from 0% to 50% by weight of a gel of an oxohydroxide of at least one metal of Groups IVA, IVB, VB and VIB of the Periodic Table or of the lanthanide and actinide series. The gel content preferably constitutes from 2% to 25% by weight and, more preferably, at least 3% by weight.

This gel is distributed uniformly both at the surface of the diaphragms according to the invention and into the depth thereof.

The content of gel, initially impregnated with sodium chloride, sodium hydroxide and water, is determined after contact at 85° C. with an aqueous solution containing 140 g/l of sodium hydroxide and 160 g/l of sodium chloride, followed by cooling to 25° C., washing with water and drying for 24 hours at 100° C.

Examples of the metals of the Groups and series of the Periodic Table which are noted above and which are representative are titanium, zirconium, thorium, cerium, tin, tantalum, niobium, uranium, chromium and iron. Mixtures of such metals or of such metals and of alkali metals such as sodium or potassium may, of course, be present in the diaphragms according to the invention.

A first class of diaphragms which are particularly advantageous will contain titanate fibers, in particular potassium titanate fibers, as the inorganic fibers, the content of which in the fiber mixture is up to at least 5% by weight, and a proportion of metal oxohydroxide gel as indicated above preferably ranging from 2% to 10% by weight.

A second class of diaphragms which are particularly advantageous will contain, as inorganic fibers, carbon or graphite fibers of monodisperse lengths, the content thereof in the fiber mixture ranging from 1% to 10% by weight, and preferably from 5% to 25% by weight of metal oxohydroxide gel as indicated above.

The diaphragms according to the invention preferably contain a gel of an oxohydroxide of at least one metal of Groups IVA and IVB.

They preferably contain a titanium or zirconium oxohydroxide gel.

The diaphragms according to this invention have been defined in terms of their essential constituents. It will be appreciated that these materials can contain various other additives in a minor amount generally not exceeding 5% by weight, which will have been added either simultaneously or successively during any of the stages of their production. Thus, they can contain tract amounts of surface-active or surfactant agents, of pore-forming agents whose function is to regulate the porosity of the diaphragm, and/or of thickeners, although such, agents are in principle decomposed or removed during the production of the said diaphragm.

The diaphragms according to the present invention advantageously have a weight per unit of surface area ranging from 0.4 to 3 kg/m² and preferably from 0.9 to 1.9 kg/m².

The present invention also features the coupling of a composite cathode component and of a diaphragm as described above.

These composite cathode (or precathodic) components are produced by the coupling of an elementary cathode comprising a highly porous metal surface and a microporous fibrous sheet containing a significant proportion of electrically conductive fibers, such fibers being microconsolidated by a fluoropolymer.

The preferred cathode (or precathodic) components according to the present invention contain carbon or graphite fibers as electrically conductive fibers. These fibers preferably have a monodisperse length distribution.

Although the fluoropolymer binder for the precathodic sheet may be selected from the fluoropolymers described above, polytetrafluoroethylene is the preferred.

These composite cathode (or precathodic) components are described in the European patent applications hereinbefore incorporated by reference.

It will be apparent that the coupling under consideration entails an assembly of one face towards the other of three layers, namely, the elementary cathode, a first fibrous sheet containing the electrically conductive fibers, such sheet having intrinsic properties which are described in said European patent applications, and the diaphragm, said assembly constituting a coherent complete organization.

Also as indicated above, the present invention also features a process for the production of the diaphragms described immediately above.

The process for the preparation of the subject diaphragms comprises the following sequence of stages:

(a) preparing, in an essentially aqueous medium, a dispersion comprising the fibers, the fluoropolymer-based binder in the form of particles, if appropriate at least one precursor of an oxohydroxide of at least one of the metals of Groups IVA, IVB, VB and VIB of the Periodic Table or of the lanthanide and actinide series, in the form of particles, and, if appropriate, additives;

(b) depositing a sheet by programmed vacuum filtration of the said dispersion through a porous support material;

(c) removing the liquid medium and, where appropriate, drying the sheet thus formed;

(d) sintering such sheet; and (e) treating, if appropriate, in situ under the conditions of the electrolysis, such sintered sheet with an aqueous solution of alkali metal hydroxide.

By "essentially aqueous medium" is intended a medium containing no organic compounds other than the constituents indicated above and additives such as surface-active agents, surfactants and thickeners. Thus, the medium in question does not contain any organic solvent.

Indeed, while the presence of organic solvents is not detrimental in and of itself, one advantage presented both by the present process and the diaphragms according to the invention is the fact that the presence of organic solvents is not necessary for the production of such diaphragms and that, as a result, it is not necessary to provide an additional stage of evaporation of the solvent. This advantage is quite surprising given that the hydrophobic nature of the fluoropolymer, and in particular PTFE, fibers and powders is known.

By "precursors of an oxohydride of one of the metals of Groups IVA, IVB, VB and VIB of the Periodic Table or of the lanthanide and actinide series" are intended salts of said metals, as poorly soluble in water as possible, in which the anion is advantageously selected from among the phosphate, pyrophosphate, hydrogen phosphate or polyphosphate anions, substituted where appropriate by an alkali metal, and silicate.

Exemplary salts which can be used according to the present process include:

Titanium phosphate ($\alpha$-TiP)

Zirconium phosphate ($\alpha$-ZrP)

Cerium phosphate $Ti(NaPO_4)_2$ $TiNaH(PO_4)_2$ $TiP_2O_7$ $TaH(PO_4)_2$ $NbOPO_4$ $UO_2HPO_4$ $Cr_5(P_3O_{10})_3$ $Fe_4(P_2O_7)_3$ The compounds corresponding to the formula $$M_{1+x}Zr_2Si_xP_{3-x}O_{12}$$

in which M is a sodium or lithium atom and x is a number which may be zero and smaller than 3.

These precursors are introduced in the form of particles. They may be introduced in the form of a powder having a particle size which is generally smaller than 500 µm or in the form of fibers whose dimensions typically range from 0.1 to 50 µm in the case of diameter and from 3 µm to 3 mm in the case of length.

The fluoropolymer-based binder is typically in the form of a dry powder or of an aqueous dispersion (latex) whose solids content constitutes from 30% to 80% by weight.

As is well known to this art, the dispersion or suspension under consideration is generally highly dilute, the content of dry matter (fibers, binder, precursors and additives) representing on the order of 1% to 15% of the weight of the entire mass, to make it easier to handle on an industrial scale.

Various additives may also be introduced into the dispersion, in particular surface-active agents or surfactants such as octoxynol (Triton X-100®), pore-forming agents such as silica, and thickening agents such as natural or synthetic polysaccharides.

The dispersion will obviously contain all of the essential constituents of the diaphragm with the exception of the oxohydroxide gel discussed above, but, if appropriate, gel precursors as described above will be present.

The relative amounts of the essential constituents of the diaphragm to be introduced into the dispersion can be readily determined by one skilled in this art, in consideration of the fact that they are substantially the same as those present in the diaphragm itself, with the exceptions of the pore-former which is in principle removed by the action, for example, of the electrolytic sodium hydroxide and of the oxohydroxide gel precursor. Indeed, the precursor is completely converted into oxohydroxide gel in which the "active" part obtained after washing and drying the gel, constitutes from 10% to 90% by weight of the precursor introduced.

One skilled in this art can also easily determine, using simple tests, the amount of dry solids to be dispersed in the aqueous medium as a function of the degree of retention which can be observed on the porous material through which the dispersion is filtered under the programmed vacuum conditions.

In general, the solids content in suspension comprises, as the principal constituents:

(i) from 30% to 80% by weight of fibers (mixture of PTFE fibers and of inorganic fibers);

(ii) from 0% to 50% by weight of at least one oxohydroxide gel precursor;

(iii) from 3% to 35% by weight of PTFE powder (binder); and (iv) from 5% to 40% by weight of silica.

To satisfactorily carry out the present invention, the content of PTFE powder constitutes from 5% to 40% by weight of the entire mass (PTFE powder+fibers). Also to advantageously carry out the present invention, the weight content of the at least one oxohydroxide gel precursor in said solids content will range from 3% to 40%.

The sheet is then formed by programmed vacuum filtration of the dispersion through a porous material such as cloths or grids in which the mesh opening, the perforations or the porosity, advantageously ranges from 1 μm to 2 mm.

The vacuum program may be continuous or stagewise, from atmospheric pressure to the final pressure (0.01 to 0.5 bars absolute).

After removal of the liquid medium and, where appropriate, the drying of the sheet thus obtained, the sheet is sintered.

The sintering is carried out in a manner known per se at a temperature above the melting or softening point of the fluoropolymer binding the sheet. This stage, which permits the sheet to be consolidated, is then followed by a stage of treatment, by means of which the sheet is contacted with an aqueous solution of alkali metal hydroxide, and more particularly with an electrolytic sodium hydroxide solution.

This contacting may be conducted in situ, namely, when the consolidated sheet is placed in the electrolysis cell, in contact with the electrolytic sodium hydroxide solution.

The contacting is advantageously carried out with an aqueous solution of sodium hydroxide, the concentration of which ranges from 40 to 200 g/l and at a temperature ranging from 20° to 95° C.

The precursors of the oxohydroxide gel, described above, are capable of undergoing various conversions during the various operations of production of the diaphragm, and especially a nondestructive conversion during the sintering operation, i.e., resulting solely in losses of molecules of water of hydration or of formation; they will be converted by the aforementioned treatment stage into a fresh gel of oxohydroxide of the metal in question, impregnated with electrolyte and with water.

The properties of a diaphragm of this type are markedly improved.

Furthermore, another advantage of the present process is the fact that it does not require any additional stage of impregnation of a fibrous matrix. Moreover, using precursors in the form of powder renders the processing considerably easier.

In a preferred embodiment of the invention, the suspension or dispersion preparation stage is preceded by a stage of preparation of the PTFE fibers by mechanical stirring of the latter in an essentially aqueous medium.

In another preferred embodiment of the invention, the filtration of the dispersion or suspension is carried out through a cathode (or precathodic) component as defined above.

Such embodiment enables production of a diaphragm/precathodic component coupling.

Such a coupling exhibits remarkable coherence properties, linking together the advantages presented by the precathodic component and the diaphragms according to the invention.

This invention also features a process for the preparation of such couplings, comprising the following sequence of stages:

(a) depositing a precathodic sheet by programmed vacuum filtration of a dispersion, in an essentially aqueous medium, of fibers, of binder in the form of particles and, if appropriate, of additives, through an elementary cathode which comprises a metal surface exhibiting a mesh opening or perforations ranging from 20 μm to 5 mm;

(b) removing the liquid medium and, where appropriate, drying the sheet thus formed;

(c) programmed vacuum filtering, through the precathodic sheet, of a dispersion, in an essentially aqueous medium, of polytetrafluoroethylene fibers, of inorganic fibers selected from among carbon, graphite and titanate fibers and mixtures thereof, of binder based on a fluoropolymer in the form of particles, if appropriate, of at least one precursor of an oxohydroxide of at least one of the metals of Groups IVA, IVB, VB and VIB of the Periodic Table or of the lanthanide and actinide series, in the form of particles and, where appropriate, of additives:

(d) removing the liquid medium and, where appropriate, drying the sheet thus formed;

(e) sintering of the resulting sheet; and (f) treating, if appropriate in situ under the conditions of the electrolysis, the sintered sheet with an aqueous solution of alkali metal hydroxide.

Such a process presents the advantage of contributing to establishing couplings of great cohesion. Another advantage is its great simplicity of implementation due to the fact that a single sintering stage is sufficient to produce couplings of high cohesion and due to the fact that a single stage makes it possible to remove the pore-formers, both from the precathodic sheet and from the diaphragm, and to provide fresh gel of oxohydroxide of the metal under consideration.

In another preferred embodiment of the invention, PTFE is used as a binder for both the precathodic sheet and the diaphragm.

In order to further illustrate the present invention and the advantages thereof, the following specific examples are given, it being understood that same are intended only as illustrative and in nowise limitative.

EXAMPLES

A suspension of the following constituents was prepared with stirring:

(A) softened water, the amount of which was calculated to provide approximately 4 liters of suspension;

(B) 100 g of polytetrafluoroethylene fibers, introduced in the form of 200 g of a mixture of sodium chloride and of PTFE fibers (50/50 by weight), pretreated as described below;

(C) PTFE in the form of a latex containing approximately 65% by weight of solids, in the amount shown in Table I below;

(D) 1.2 g of octoxynol in the form of a solution in water at a concentration of 40 g/l;

(E) silica in the form of particles having a mean particle size of 3 μm and whose BET surface area was 250 m$^2$/g, in an amount shown in Table I below;

(F) graphite fibers whose diameter was approximately 10 μm and whose average length was 1.5 mm, in the amount shown in Table: I below;

(G) potassium titanate fibers having a diameter of 0.2 to 0.5 μm and a length of 10 to 20 μm, in the amount shown in Table I below;

(H) titanium phosphate (α-TiP) powder having an average diameter of 0.5 μm or zirconium phosphate powder having an average diameter of 1 μm, in the amount shown in Table I below;

(I) 1.5 g of xanthan gum.

The PTFE fibers impregnated with sodium chloride were pretreated by mixing a solution of one liter of water containing approximately 100 g of a mixture containing approximately 50% (wt) of PTFE fibers and 50% (wt) of sodium chloride.

This operation was optionally repeated such as to provide the intended quantity of PTFE fibers.

The solution(s) was (were) then poured into a receptacle containing the remainder of water required for the preparation of the suspension.

Indeed, the total volume of water was calculated such that the weight percentage of dry matter (B+C+E+F+G+H)/A was approximately 4.5%.

The various ingredients of the abovementioned mixture were then added successively with stirring.

Stirring was carried out for 30 min.

The solution was maintained for 48 hours.

The required volume of solution was withdrawn, such that it contained the amount of solids content intended to be deposited to form the diaphragm (on the order of 1.4 kg/m$^2$).

The suspension was stirred again for 30 min before use.

The filtration was conducted under a programmed vacuum on a bulk cathode (prepared beforehand according to Example 7 of European Patent Application No. 296,076) as follows:

1 min at a vacuum of −5 to −10 mbar relative pressure in relation to atmospheric pressure;

increasing the vacuum at a rate of 50 mbar/min;

dewatering for 15 min at maximum vacuum (approximately −800 mbar relative pressure in relation to atmospheric pressure).

The composite was then sintered after optional drying at 100° C. and/or intermediate stabilization of the temperature, by heating the cathode assembly and the diaphragm to 350° C. for 7 min.

The materials of Examples 1 and 2 were prepared with the following alternative form of the process;

ingredients A, B and C were mixed with stirring for 30 min;

the other ingredients were added and the entire mass was stirred for 30 min;

the entire mass was treated by mixing, optionally repeated, of one-liter solutions before the suspension was permitted to stand for 48 hours.

The performances of the various composite materials, the production of which was as described immediately above, were then evaluated in an electrolysis cell which exhibited the following characteristics and the operating conditions of which were as indicated below:

Rolled, expanded titanium anode coated with $TiO_2RuO_2$;

Cathode component made of braided and rolled mild steel; 2 mm wires, 2 mm mesh covered with the precathodic sheet and the diaphragm;

Anode/cathode component distance: 6 mm;

Active surface area of the electrolyzer: 0.5 dm$^2$;

Cell assembled according to the filter press type;

Current density: 25 A dm$^{-2}$ (unless specified otherwise);

Temperature: 85° C.;

Operation at constant anode chloride: 4.8 mol l$^{-1}$;

Electrolytic sodium hydroxide concentration: 120 or 200 g1.

The particular conditions and the results obtained are reported in Table I below:

FY: Faraday yield

ΔU: voltage at the terminals of the electrolyzer under the specified current density.

Performance (kW h/T Cl$_2$)=energy consumption of the system, in kilowatt hours per ton of chlorine produced.

TABLE I

| Example No. | C PTFE in latex form | E Inorganic fibers (g) | | | Precursors (g) | |
|---|---|---|---|---|---|---|
| | | S* | F graphite | G potassium titanate | α-TiP | α-ZrP |
| 1 | 25 | 30 | 2.5 | 0 | 0 | 0 |
| 2 | 25 | 30 | 2.5 | 0 | 60 | 0 |
| 3 | 25 | 30 | 2.5 | 35 | 0 | 0 |
| 4 | 25 | 30 | 3.5 | 30 | 0 | 0 |
| 5 | 20 | 30 | 0 | 20 | 0 | 0 |
| 6 | 20 | 30 | 0 | 20 | 20 | 0 |
| 7 | 20 | 30 | 0 | 20 | 0 | 20 |
| 8 | 40 | 30 | 0 | 40 | 0 | 0 |
| 9 | 25 | 40 | 0 | 60 | 0 | 0 |
| 10 | 40 | 60 | 0 | 100 | 0 | 0 |
| 11 | 40 | 60 | 0 | 140 | 0 | 0 |
| 12 | 40 | 60 | 0 | 100 | 40 | 0 |
| 13 | 40 | 60 | 0 | 100 | 80 | 0 |

| Example No. | Weight deposited in kg/m$^2$ | ΔU volts | FY (%) | NaOH concentration g/l | Performance kW h/T Cl$_2$ |
|---|---|---|---|---|---|
| 1 | 1.88 | 4.2 | 90 | 120 | 3,530 |
| 2 | 1.53 | 3.25 | 89 | 120 | 2,760 |
| | | | 82.5 | 200 | 2,980 |
| 3 | 1.55 | 3.15 | 96 | 120 | 2,480 |
| | | | 86 | 200 | 2,770 |
| 4 | 1.40 | 3.25 | 95 | 140 | 2,585 |

TABLE I-continued

|   |      |      |      |     |       |
|---|------|------|------|-----|-------|
|   |      |      | 88   | 200 | 2,790 |
| 5 | 1.28 | 3.2  | 96   | 130 | 2,520 |
|   |      |      | 88   | 200 | 2,750 |
| 6 | 1.45 | 3.25 | 97.5 | 120 | 2,520 |
|   |      |      | 92   | 200 | 2,670 |
| 7 | 1.34 | 3.10 | 97.5 | 130 | 2,405 |
|   |      |      | 87.5 | 200 | 2,680 |
| 8 | 1.5  | 3.20 | 96   | 140 | 2,520 |
|   |      |      | 84   | 200 | 2,880 |
| 9 | 1.6  | 3.10 | 94   | 140 | 2,495 |
|   |      |      | 86   | 200 | 2,725 |
| 10| 1.7  | 3.15 | 96.5 | 140 | 2,465 |
|   |      |      | 83.5 | 200 | 2,850 |
| 11| 1.43 | 3.3  | 92.5 | 140 | 2,695 |
|   |      |      | 80   | 200 | 3,120 |
| 12| 1.25 | 2.95 | 94   | 140 | 2,370 |
|   |      |      | 83   | 200 | 2,685 |
| 13| 1.4  | 3.05 | 93   | 140 | 2,480 |
|   |      |      | 82   | 200 | 2,810 |

S* = silica

The materials of Examples 5 and 6 were tested under current densities ranging from 30 to 40 A/dm$^2$. The results are reported in Table II below:

TABLE II

| Example No. | Density A/dm$^2$ | ΔU volts | FY (%) | NaOH concentration | Performance kW h/T Cl$^2$ |
|---|---|---|---|---|---|
| 5 | 30 | 3.40 | 88   | 200 | 2,920 |
|   | 35 | 3.60 | 88.5 |     | 3,075 |
|   | 40 | 3.75 | 88   |     | 3,265 |
| 6 | 30 | 3.53 | 91.5 | 200 | 2,915 |
|   | 35 | 3.75 | 91.5 |     | 2,098 |
|   | 40 | 3.95 | 91.5 |     | 3,265 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A microporous diaphragm which comprises a sintered, fluoropolymer microconsolidated asbestos-free microporous fibrous sheet material, said sheet material comprising from 3% to 35% by weight of a fluoropolymer binder comprising a homopolymer or a copolymer derived at least partly from olefinic monomers completely substituted by fluorine atoms or completely substituted by a combination of fluorine atoms and of at least one of chlorine, bromine or iodine atoms per monomer, from 0% to 50% by weight of a gel of an oxohydroxide of at least one metal of Groups IVA, IVB, VB and VIB of the Periodic Table or of the lanthanide or actinide series thereof, and from 20% to 95% by weight of a mixture of polytetrafluoroethylene fibers and inorganic fibers, said inorganic fibers constituting from 1% to 80% by weight of such mixture and said inorganic fibers comprising titanate fibers, optionally in admixture with carbon or graphite fibers, or admixture thereof, wherein said diaphragm is non-conductive.

2. The microporous diaphragm as defined by claim 1, said inorganic fibers comprising titanate fibers, in an amount of at least 5% by weight of such mixture.

3. The microporous diaphragm as defined by claim 2, comprising from 2% to 10% by weight of said oxohydroxide gel.

4. The microporous diaphragm as defined by claim 1, said inorganic fibers comprising carbon or graphite fibers monodisperse in length, in an amount ranging from 1% to 10% by weight of such mixture.

5. The microporous diaphragm as defined by claim 1, comprising a gel of an oxohydroxide of at least one Group IVA and IVB metal.

6. The microporous diaphragm as defined by claim 1, comprising a gel of titanium or zirconium oxohydroxide.

7. The microporous diaphragm as defined by claim 1, said fluoropolymer binder comprising polytetrafluoroethylene.

8. The microporous diaphragm as defined by claim 1, comprising from 5% to 40% by weight of said fluoropolymer binder based on the total weight of fibers+binder.

9. An assembly adapted for incorporation in an electrolytic cell, comprising a composite cathode component consolidated with the microporous diaphragm as defined by claim 1.

10. The electrolytic assembly as defined by claim 9, said composite cathode component comprising an elementary cathode having a highly porous metal surface, said metal surface having deposited thereon a fluoropolymer microconsolidated microporous fibrous sheet material which comprises an amount of electrically conductive fibers.

11. The electrolytic assembly as defined by claim 10, said electrically conductive fibers comprising carbon or graphite fibers monodisperse in length.

12. The electrolytic assembly as defined by claim 10, the fluoropolymer binder material comprising polytetrafluoroethylene.

13. An electrolytic cell comprising the electrolytic assembly as defined by claim 9.

14. A process for the production of the micro-porous diaphragm as defined by claim 1, comprising (a) formulating an essentially aqueous dispersion of said fibers, particulates of said fluoropolymer binder and, optionally particulates of at least one precursor of an oxohydroxide of at least one metal of Groups IVA, IVB, VB and VIB of the Periodic Table or of the lanthanide or actinide series thereof, (b) depositing a sheet material by vacuum filtering said dispersion through a porous support substrate, (c) removing the liquid material therefrom and optionally drying the sheet material thus formed, (d) sintering said sheet material, and (e) treating said sintered sheet material with an aqueous solution of alkali metal hydroxide.

15. The process as defined by claim 14, said porous support substrate comprising a composite cathode component.

16. The process as defined by claim 14, said essentially aqueous dispersion comprising a poorly water-soluble salt of a metal of Groups IVA, IVB, VB and VIB of the Periodic Table or of the lanthanide or actinide series thereof, the anion of which comprising a phosphate, pyrophosphate, hydrogen phosphate or polyphosphate, optionally substituted by an alkali metal, and silicate.

17. The process as defined by claim 16, said oxohydroxide precursor comprising α-TiP or α-ZrP.

18. The process as defined by claim 14, said aqueous dispersion comprising from 5% to 40% by weight of silica.

19. A microporous diaphragm which comprises a sintered, fluoropolymer micro consolidated asbestos-free microporous fibrous sheet material, said sheet material comprising from 3% to 35% by weight of a fluoropolymer binder, an amount of from 5% to 25% by weight of a gel of an oxohydroxide of at least one metal of Groups IVA, IVB, VB and VIB of the Periodic Table or of the lanthanide or actinide series thereof, and from 20% to 95% by weight of a mixture of polytetrafluoroethylene fibers and inorganic fibers, said inorganic fibers constituting from 1% to 80% by weight of such mixture and said inorganic fibers comprising carbon, graphite or titanate fibers, or mixtures thereof.

20. A microporous diaphragm which comprises a sintered, fluoropolymer microconsolidated asbestos-free microporous fibrous sheet material, said sheet material comprising from 30 to 35% by weight of a fluoropolymer binder comprising a homopolymer or a copolymer derived at least partly from olefinic monomers completely substituted by fluorine atoms or completely substituted by a combination of fluorine atoms and of at least one of chlorine, bromine or iodine atoms per monomer, from 0 to 50% by weight of a gel of an oxyhydroxide of at least one metal of Groups IVA, IVB, VB and VIB of the Periodic Table or of the lanthanide or actinide series thereof, and from 20 to 95% by weight of a mixture of polytetrafluoroethylene fibers and inorganic fibers, said inorganic fibers constituting from 1% to 80% by weight of such mixture and said inorganic fibers comprising at least 5% by weight of titanate fibers or from 1 to 10% by weight of carbon or graphite fibers.

21. A microporous diaphragm which comprises a sintered, fluoropolymer microconsolidated asbestos-free microporous fibrous sheet material, said sheet material comprising from 3% to 35% by weight of a fluoropolymer binder, from 2% to 50% by weight of a gel of an oxohydroxide of at least one metal of Groups IVA, IVB, VB and VIB of the Periodic Table or of the lanthanide or actinide series thereof, and from 20% to 95% by weight of a mixture of polytetrafluoroethylene fibers and inorganic fibers, said inorganic fibers constituting from 1% to 80% by weight of such mixture and said inorganic fibers comprising carbon, graphite or admixture thereof, wherein said diaphragm is non-conductive.

22. The microporous diaphragm as defined by claim 21 comprising from 2% to 10% by weight of said oxohydroxide gel.

23. The microporous diaphragm as defined by claim 21 wherein said inorganic fibers comprise carbon or graphite fibers monodisperse in length, in an amount ranging from 1% to 10% by weight of such mixture.

24. The microporous diaphragm as defined by claim 23, comprising from 5% to 25% by weight of said oxohydroxide gel.

25. The microporous diaphragm as defined by claim 21, comprising a gel of an oxohydroxide of at least one Group IVA and IVB metal.

26. The microporous diaphragm as defined by claim 21, comprising a gel of titanium or zirconium oxohydroxide.

27. The microporous diaphragm as defined by claim 21 wherein said fluoropolymer binder comprises polytetrafluorethylene.

28. The microporous diaphragm as defined by claim 21, comprising from 5% to 40% by weight of said fluoropolymer binder based on the total weight of fibers+binder.

29. An assembly for incorporation in an electrolytic cell, comprising a composite cathode component consolidated with the microporous diaphragm as defined by claim 21.

30. The electrolytic assembly as defined by claim 29, wherein said composite cathode component comprises an elementary cathode having a highly porous metal surface, said metal surface having deposited thereon a fluoropolymer microconsolidated microporous fibrous sheet material which comprises an amount of electrically conductive fibers.

31. The electrolytic assembly as defined by claim 30, wherein said electrically conductive fibers comprise carbon or graphite fibers monodisperse in length.

32. The electrolytic assembly as defined by claim 30, wherein the fluoropolymer binder material comprises polytetrafluoroethylene.

33. An electrolytic cell comprising the electrolytic assembly as defined by claim 29.

34. A process for the production of the micro-porous diaphragm as defined by claim 21, comprising (a) formulating an essentially aqueous dispersion of said fibers, particulates of said fluoropolymer binder and, particulates of at least one precursor of an oxohydroxide of at least one metal of Groups IVA, IVB, VB and VIB of the Periodic Table or of the lanthanide or actinide series thereof, (b) depositing a sheet material by vacuum filtering said dispersion through a porous support substrate, (c) removing the liquid material therefrom and optionally drying the sheet material thus formed, (d) sintering said sheet material, and (e) treating said sintered sheet material with an aqueous solution of alkali metal hydroxide.

35. The process as defined by claim 34, said porous support substrate comprising a composite cathode component.

36. The process as defined by claim 34, said essentially aqueous dispersion comprising a poorly water-soluble salt of a metal of Groups IVA, IVB, VB and VIB of the Periodic Table or of the lanthanide or actinide series thereof, the anion of which comprising a phosphate, pyro-phosphate, hydrogen phosphate or polyphosphate, optionally substituted by an alkali metal, and silicate.

37. The process as defined by claim 36, said oxohydroxide precursor comprising $\alpha$-TiP or $\alpha$-ZrP.

38. The process as defined by claim 34, said aqueous dispersion comprising from 5% to 40% by weight of silica.

* * * * *